May 4, 1954 G. B. LITCHFORD 2,677,766
SCALLOPED LIMACON PATTERN ANTENNA
Filed May 18, 1949
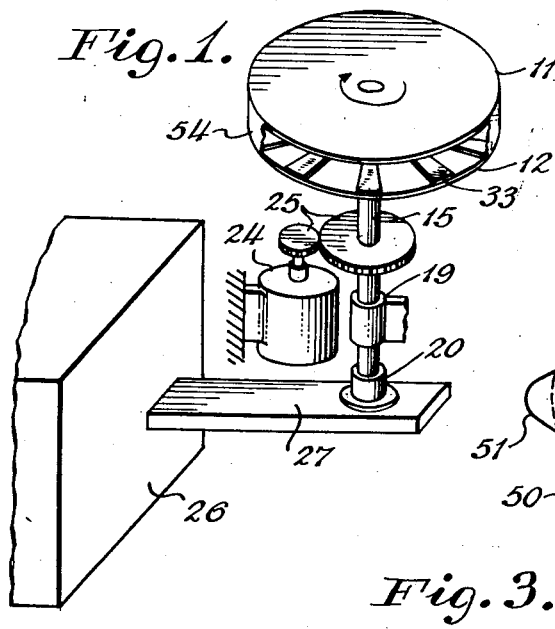
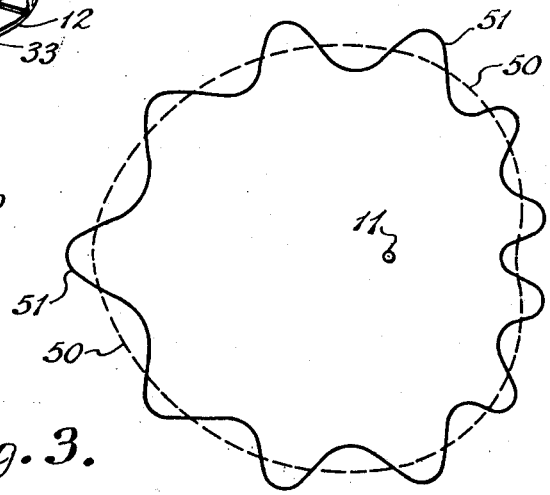
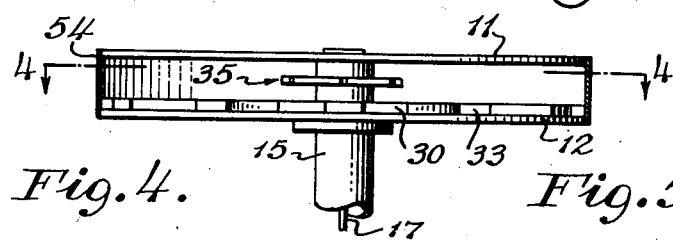
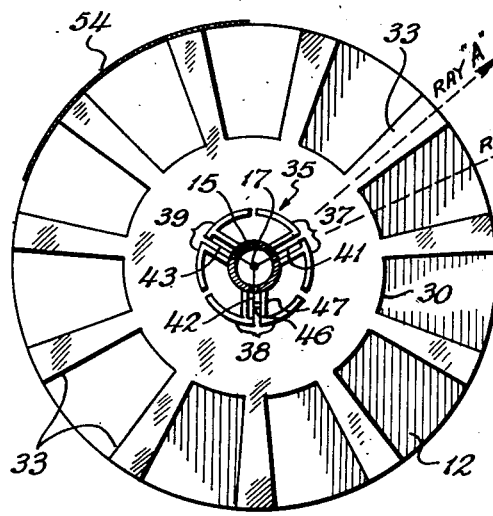
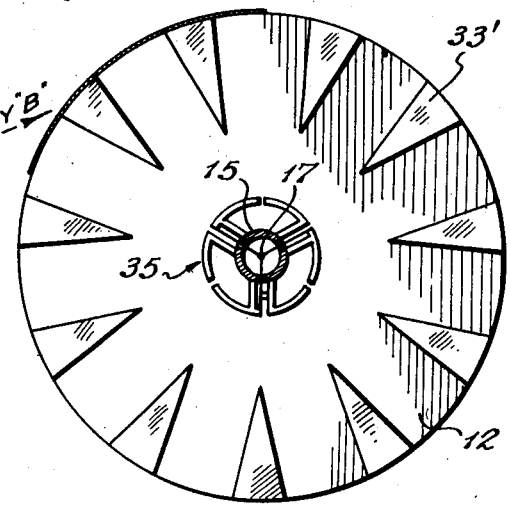
INVENTOR
GEORGE B. LITCHFORD
BY
ATTORNEY Patented May 4, 1954

2,677,766

UNITED STATES PATENT OFFICE 2,677,766

SCALLOPED LIMAÇON PATTERN ANTENNA

George B. Litchford, Huntington, N. Y., assignor to The Sperry Corporation, a corporation of Delaware Application May 18, 1949, Serial No. 94,011

8 Claims. (Cl. 250—33.63)

This invention relates to directive antennas for producing a scalloped or multi-fingered azimuthal directive pattern having a general limaçon shape, suitable for high accuracy navigation systems.

In copending application Serial No. 782,722 for Omni-Azimuth Guidance System, filed October 29, 1947, issued as Patent No. 2,564,703 granted August 21, 1951, an improved omni-azimuth movable craft guidance system of very high directional accuracy is described and claimed. That system achieves high accuracy through use of a regularly rotated transmitting antenna arranged to produce a general limaçon azimuth directivity pattern modified by a scalloped or multi-fingered outline. Through the rotation of this special antenna pattern, a craft at some point remote from the rotating antenna system receives energy therefrom which appears as an amplitude-modulated wave having a low frequency modulation component and a high frequency modulation component. Low- and high-frequency phase reference signals are transmitted for comparison with these respective components in a craft direction indicating system. The craft direction indicator is brought into the approximate angular setting by the phase comparison between the low frequency signals, and thereafter is controlled precisely by the phase comparison between the high frequency signals.

Copending application Serial No. 782,721 for Scalloped Limaçon Pattern Antenna, filed October 29, 1947, issued as Patent No. 2,567,220 granted September 11, 1951, discloses one type antenna system suitable for use in the omni-azimuth guidance system described above. That application discloses two conductive discs with scalloped peripheries and a radiator centrally located between the discs. A disadvantage of this antenna system is that it is difficult to enclose the system so as to protect it from the weather elements.

It is an object of the present invention to provide an improved rotatable antenna system suitable for use in an omni-azimuth guidance system of the type described above.

A further object of this invention is to provide a rotatable antenna system or energy conveyor for producing a scalloped or multi-fingered azimuthal directive pattern having a general limaçon shape wherein the antenna structure has great mechanical strength so as to permit high speed rotation.

A still further object of this invention is to provide a rotatable antenna system which may be completely enclosed by a weather-tight member so that the system is not affected by the weather elements and so that wind resistance is negligible.

Further objects and advantages of the invention will be apparent from the following description, the appended claims and the drawings, in which Fig. 1 is an oblique view, partially broken away, of one embodiment of the antenna system;

Fig. 2 is a polar intensity plot of the azimuthal directivity pattern of the antenna;

Figs. 3 and 4 are elevation and sectional views of one embodiment of the antenna system illustrating the arrangement of the center radiator unit for determining the general limaçon shape of the directivity pattern of Fig. 2; and Fig. 5 is a sectional view of an alternative embodiment of the antenna system.

In accordance with this invention, a radiator for producing a general limaçon-shaped azimuth directivity pattern is provided between the central regions of two parallel circular discs having their axes aligned along a common vertical axis. A series of $n$ radially extending spokes of dielectric material spaced at angular intervals are affixed to the surface of one of the discs and extend into the space between the two discs for producing $n$ fingers or scallops in the azimuth directivity pattern. The radial spokes of dielectric material may be connected at their inner ends by a hub of dielectric material or they may be disconnected from one another. In the latter case each radial spoke is triangular-shaped so as to minimize the energy reflected by the spoke.

Referring to Figs. 1, 3 and 4, an upper conductive disc 11 and a lower conductive disc 12 are arranged in substantially parallel and coaxial orientations on the outer conductor 15 of a coaxial transmission line having an inner conductor 17. The outer conductor 15 of the transmission line is preferably a rigid cylinder of relatively hard metal borne in vertical-axis journals 19 and 20 to provide for rotation of the system 11, 12, 15, 17. A motor 24 is coupled to the rigid cylindrical outer conductor 15 through gears 25.

Ultra-high-frequency energy for radiation through the antenna system is provided by a transmitter 26, through a wave guide 27 into which extends the inner conductor 17 of the coaxial transmission line.

A hub 30 of dielectric material having $n$ angularly spaced extensions forming radial spokes 33 is affixed, as for example, by cement, to lower disc 12. This number $n$ is taken as 11 in the illustrations.

A central radiator 35 is provided between discs 11 and 12. This radiator comprises three dipole or doublet antenna portions 37, 38 and 39, each having two arcuate arms rigidly supported on parallel arms attached to and extending substantially radially outwardly from the outer conductor 15 of the transmission line. Alternate arcuate arms, e. g., the clockwise arcuate arms of the dipoles 37, 38, 39 are connected by radial conductors 41, 42 and 43 to the inner conductor 17 of the coaxial transmission line. These radially extending conductors pass through clearance holes in the outer conductor 15.

A shorting bar 46 is provided for affording a current path between radial conductor 42 and one substantially radial rigid supporting arm 47. Without such a bar 46, the three arcuate dipole systems 37, 38 and 39 would be energized cophasally and in equal intensities and a generally circular intensity pattern would be produced. The shorting bar 46 is provided for distorting the radiation pattern of radiator 35 so as to reduce the intensity in the direction of conductor 42 and cause a general limaçon-shaped pattern to be produced. The nature of the radiation pattern produced by the radiator 35 alone is illustrated by the dashed line 50 in Fig. 2, the minimum radius portion thereof corresponding to the direction of the radial conductor 42.

The $n$ radial spokes 33 serve to cause the radiation pattern to have $n$ fingers or scallops as illustrated by the solid line 51 in Fig. 2.

This pattern is produced as a result of the phase difference between components of the electromagnetic energy being radiated from the center of the antenna system through the phase shifting elements and into space. The minima in the radiation pattern occur in the various directions along which there is maximum phase difference and the maxima in the radiation pattern occur in the various directions along which there is maximum phase coincidence.

The two discs 11 and 12 serve as an omni-directional wave guide, excited in the center and conveying energy radially outward in all directions. The effective dielectric constant of a piece of dielectric material affixed to one side of a wave guide is discussed in the book "Microwave Transmission Design Data" by T. Moreno, published by McGraw-Hill Book Company in 1948, pages 190-195. Because of the differences in the effective dielectric constant at different azimuth angles around radiator 35, the energy radiated from between discs 11 and 12 into space is shifted in phase by different amounts, depending upon the angle at which it is radiated.

The energy, such as ray A, indicated in Fig. 4, for example, which is radiated through a section of the antenna system which has a large effective dielectric constant has a lower phase velocity than the energy, such as ray B indicated in Fig. 4, for example, which is radiated through a section of the antenna system which has a smaller dielectric constant.

Consequently, various portions of the energy radiated into space differ in phase with the remainder of the radiated energy and phase interference results.

The phase difference between these two components is substantially directly proportional to the thickness of the dielectric material and inversely proportional to the spacing between the two discs 11 and 12. For use in the guidance system disclosed in the above-mentioned application Serial No. 782,722, the phase difference between the two components is preferably in the order of 90° so as to produce a radiation pattern of the general configuration shown in Fig. 2.

It will be apparent that the signal strength of the minima in the radiation pattern is substantially inversely proportional to the phase difference between the two radiated energy components. If the phase difference is 180° the minima do not extend an appreciable distance beyond the antenna system.

The discs 11 and 12 are formed with much larger diameters than the diameter of radiator 35, and are spaced apart by an axial dimension of the order of one wavelength at the operating frequency. The diameter of the discs is substantially directly proportional to the number of scallops or fingers to be produced in the radiation pattern and to the signal strength ratio desired between the minima and maxima in the radiation pattern.

Representative materials and dimensions for the antenna system disclosed in Figs. 3 and 4, for operation at a frequency of the order of 5000 megacycles, are as follows:

Discs 11 and 12—Aluminum plates ¼" thick and 11" in diameter.
Hub 30—Polystyrene ⅜" thick and 5⅞" in diameter.
Spokes 33—Polystyrene ⅜" thick and ¾" wide at the outer periphery.
Radius of dipoles 37, 38 and 39—¾".
Spacing between the opposed surfaces of discs 11 and 12—2".
Outer diameter of cylinder 15—⅝".

Preferably, the hub and spokes are a unitary solid dielectric member.

In order to protect the antenna system from the weather elements a dielectric housing may be employed to enclose the space between discs 11 and 12. For example, a strip of fiberglass 54 of uniform thickness may be connected between the outer peripheries of discs 11 and 12.

Fig. 5 shows an alternative dielectric configuration which may be used in the antenna system disclosed in Figs. 1, 3 and 4. In this embodiment spokes 33' are affixed to disc 12 as before, but they are not connected by a common hub. Each spoke is triangular- or wedge-shaped so as to minimize the energy reflected by the spokes.

For use in an antenna system of the general type described with reference to Figs. 3 and 4, representative dimensions for triangular-shaped spokes of polystyrene as illustrated in Fig. 5 are as follows:

Thickness—⅜".
Width at outer periphery—1⅝".
Length—2 7/16".

It is believed that the embodiment of the invention disclosed in Fig. 5 functions in an analogous manner to the embodiment disclosed in Figs. 3 and 4.

It will be apparent that various modifications may be made in the embodiments of the invention disclosed herein without departing from the scope of the invention. For example, the dielectric members could be affixed to both the upper and lower discs, other configurations of dielectric material could be employed, a different number of radial spokes could be employed, and other type of central radiators could be employed.

Also, is will be apparent that the antenna system may be employed as a receiver as well as a radiator wave energy.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electromagnetic energy conveyor comprising a pair of substantially parallel spaced conductive discs having a common axis and adapted for use with an antenna centrally located in the space between said discs, and a plurality of spokes of dielectric material spaced at angular intervals and extending radially with respect to said common axis, said spokes being affixed to one of said discs in the space between said discs, the spokes being of such thickness so as to fill only a portion of the space between the discs.

2. An antenna system comprising a coaxial transmission line for conveying electromagnetic energy, two conductive discs affixed to and coaxial with the outer conductor of said coaxial line and in mutually spaced relation thereon, a plurality of arcuate dipoles encircling said coaxial line in a plane between said discs, means connecting said dipoles to said coaxial line for exciting said dipoles and thereby sending energy radially outward between said discs, a shorting bar connected across one of the dipoles for reducing the radiation intensity therefrom and a plurality of spokes of dielectric material spaced at angular intervals and extending radially with respect to said dipoles, said spokes being affixed to one of said discs in the space between said discs.

3. An antenna system comprising a pair of spaced discs having a common axis and two mutually opposed conductive surfaces, a centrally located antenna mounted between said surfaces, the antenna and discs being rotatable as a unit, and a plurality of spokes of dielectric material extending substantially radially with respect to the antenna and spaced at angular intervals in the space between said discs, the spokes of dielectric material extending transversely into the space between the discs a distance less than one-half the distance between the discs.

4. An antenna system comprising a pair of spaced discs having a common axis and two mutually opposed conductive surfaces; a centrally located antenna mounted between said surfaces, said antenna comprising three dipole elements with the doublet arms of each arranged in a respective arc, said arcs lying in a common circle, and a shorting bar connected across one dipole element for reducing the radiation intensity therefrom; and a plurality of spokes of dielectric material extending substantially radially with respect to said antenna and spaced at angular intervals in the space between said discs for providing a predetermined number of scallops in the directivity pattern of the antenna system.

5. An electromagnetic energy conveyor comprising a pair of spaced conductive discs having a common axis and adapted for use with an antenna centrally located in the space between said discs, and a plurality of spokes of dielectric material extending substantially radially with respect to said common axis and secured to one of said discs, the spokes being of such thickness as to fill only a portion of the space between the discs.

6. An electromagnetic energy conveyor comprising a pair of substantially parallel spaced conductive discs having a common axis and adapted for use with an antenna centrally located in the space between said discs, and a plurality of spokes of dielectric material secured between said discs and spaced at angular intervals therebetween, the spokes having arcuate outer ends defining a single circle in a plane parallel to the discs and having a maximum width at their outer periphery of less than the distance between the discs, the number of complete spokes extending radially in one quadrant being at least two.

7. An electromagnetic energy conveyor comprising a pair of substantially parallel spaced conductive discs having a common axis and adapted for use with an antenna centrally located in the space between said discs, and a plurality of spokes of dielectric material secured between said discs and spaced at angular intervals therebetween with the arcuate space between the spokes being greater than the arcuate space subtended by the spokes, the number of complete spokes extending radially in one quadrant being at least two.

8. An electromagnetic energy conveyor comprising a pair of substantially parallel spaced conductive discs having a common axis and adapted for use with an antenna centrally located in the space between said discs, and a plurality of spokes of dielectric material secured between said discs and spaced at angular intervals therebetween, the spokes having a width at their outer periphery of substantially a wavelength at the operating frequency and the outer periphery of the spokes being within the outer edge of the discs.

References Cited in the file of this patent

UNITED STATES PATENTS

| Number | Name | Date |
|---|---|---|
| 2,433,924 | Riblet | Jan. 6, 1948 |
| 2,460,401 | Southworth | Feb. 1, 1949 |
| 2,527,222 | Iams | Oct. 24, 1950 |
| 2,532,551 | Jarvis | Dec. 5, 1950 |
| 2,599,896 | Clark et al. | June 10, 1952 |